(12) United States Patent
Bartoli et al.

(10) Patent No.: US 11,618,205 B2
(45) Date of Patent: Apr. 4, 2023

(54) METHOD AND APPARATUS FOR MAKING CAPSULES PROVIDED WITH FILTER

(71) Applicant: SARONG SOCIETA' PER AZIONI, Reggiolo (IT)

(72) Inventors: Andrea Bartoli, Reggio Emilia (IT); Davide Capitini, Reggio Emilia (IT)

(73) Assignee: Sarong Societa' Per Azioni, Reggiolo (IT)

( * ) Notice: Subject to any disclaimer, the term of this patent is extended or adjusted under 35 U.S.C. 154(b) by 288 days.

(21) Appl. No.: 16/500,299

(22) PCT Filed: Apr. 6, 2018

(86) PCT No.: PCT/IB2018/052397
§ 371 (c)(1),
(2) Date: Oct. 2, 2019

(87) PCT Pub. No.: WO2018/189632
PCT Pub. Date: Oct. 18, 2018

(65) Prior Publication Data
US 2020/0070398 A1   Mar. 5, 2020

(30) Foreign Application Priority Data
Apr. 13, 2017  (IT) .......................... 102017000041430

(51) Int. Cl.
*B29C 51/14* (2006.01)
*B29C 51/30* (2006.01)
(Continued)

(52) U.S. Cl.
CPC .............. *B29C 51/14* (2013.01); *B29C 51/30* (2013.01); *B29C 51/421* (2013.01); *B29K 2101/12* (2013.01); *B29L 2031/7174* (2013.01)

(58) Field of Classification Search
CPC ......... B29C 51/02; B29C 51/04; B29C 51/00; B29C 51/14; B29C 51/421; B29C 51/30;
(Continued)

(56) References Cited

U.S. PATENT DOCUMENTS 4,506,495 A * 3/1985 Romagnoli ............. B29C 51/30
  53/559
4,801,347 A * 1/1989 Garwood ............ B29C 49/0047
  156/245

(Continued)

FOREIGN PATENT DOCUMENTS

EP        1120359 A1    8/2001
WO    2013064988 A1    5/2013
(Continued)

OTHER PUBLICATIONS

International Search Report and Written Opinion of the International Searching Authority Application No. PCT/IB2018/052397 Completed: May 29, 2018; dated Jun. 7, 2018 17 pages.

*Primary Examiner* — Monica A Huson
(74) *Attorney, Agent, or Firm* — Whitmyer IP Group LLC (57) ABSTRACT

A method for making a capsule provided with a body containing a filtering element suitable for receiving a product for preparing a beverage, including: supplying a first film of thermoplastic material and a second film of filtering material to a forming mold according to a supplying direction, superimposing the second film on the first film, the forming mold including a lower half mold in which a plurality of cavities is obtained and an upper half mold provided with a plurality of stretching elements, one for each cavity, which are movable in one direction that is perpendicular to the supplying direction; pre-heating to a softening temperature the first film of thermoplastic material, by a pre-heating device arranged upstream of the forming mold; closing the forming mold bringing the lower half mold and the upper half mold towards one another until they clamp between one another the first film of thermoplastic material and the second film of filtering material; simultaneously forming in the cavities the bodies of the capsules and the respective filtering elements, using the stretching elements. An apparatus for making a capsule provided with a body (Continued)

containing a filtering element suitable for receiving a product for preparing a beverage, including: one forming mold including a lower half mold wherein a plurality of cavities is obtained and an upper half mold provided with a plurality of stretching elements, one for each cavity, movable in one direction, a supplying means that is movable in one advancement direction that is perpendicular to the direction, to supply simultaneously to the forming mold and to keep taut a first film of thermoplastic material and a second film of filtering material, a pre-heating device for pre-heating at least the first film of thermoplastic material before it is supplied to the forming mold.

13 Claims, 8 Drawing Sheets

(51) Int. Cl.
  *B29C 51/42*  (2006.01)
  *B29K 101/12*  (2006.01)
  *B29L 31/00*  (2006.01)

(58) Field of Classification Search
  CPC .... B29K 2995/0068; B29K 2995/0065; B29K 2101/12; B29L 2009/001; B29L 2031/7174; B29L 2031/14
  See application file for complete search history.

(56) References Cited

U.S. PATENT DOCUMENTS

| | | |
|---|---|---|
| 6,318,988 B1 | 11/2001 | Wrobbel |
| 2004/0232595 A1 | 11/2004 | Bartoli |
| 2015/0128525 A1* | 5/2015 | Bartoli ................ B65B 29/02 53/410 |

FOREIGN PATENT DOCUMENTS

| | | |
|---|---|---|
| WO | 2013171663 A1 | 11/2013 |
| WO | 2016067128 A1 | 5/2016 |

* cited by examiner

METHOD AND APPARATUS FOR MAKING CAPSULES PROVIDED WITH FILTER

TECHNICAL FIELD

The present invention relates to a method and an apparatus for making capsules or similar containers by means of thermoforming, that are provided with an inner filter suitable for containing a product for preparing a beverage, for example coffee, tea, or other beverages.

BACKGROUND

There are known single-use capsules, sealed with a filtering element or an inner filter, comprising an external container or casing, made of plastic material, having a glass or cup shape, provided with a bottom wall and a side wall defining an open cavity. The opening of the latter is hermetically closed by a covering element in such a way as to seal inside the cavity of the casing the filtering element containing the product from which the beverage is obtained. The covering element and the bottom wall of the container are generally pierceable to allow the introduction of a liquid under pressure, typically water, (typically through the covering element) and the extraction of the beverage obtained by means of percolation of the aforesaid liquid through the product (typically through the bottom wall).

The filter, which is shaped in such a way as to make one respective upward open cavity for containing the product, is sealed to the side wall of the container at its upper peripheral edge. The filter thus divides the interior of the container into one first upper chamber containing the product and accessible through the upper opening of the container (to allow the filling) and one second lower chamber, comprised between the filter and the bottom wall and/or the side wall of the container, allowing to withdraw the beverage obtained from the product.

The casing of plastic material and the filtering element are generally made separately and associated in one packaging machine which also provides for the filling with the beverage preparation product and closing the capsule with the covering element.

The capsule casing may be made in thermoforming apparatuses comprising a plurality of operating stations through which a sheet of thermoformable plastic material unwound from a coil is advanced by means of suitable advancement means.

Operating stations generally comprise in sequence a heating station, a forming station and a shearing station.

In the heating station the sheet material is prepared for the subsequent forming operation i.e. it is heated until it reaches a predetermined softening temperature, in order to increase plasticity and deformability thereof. The forming station comprises one forming mold wherein one or more punches push the sheet inside respective cavities of a die in such a way as to make the casings. In the shearing station one shearing element separates the casings formed on the plastic material sheet, shearing the latter according to preset cutting outlines.

The capsule casing can alternatively be made in injection forming apparatuses comprising one closed mold wherein the plastic material at the melting temperature is injected at high pressure to make one single capsule or a plurality of capsules, for instance arranged in rows or along a two-dimensional array.

The filtering element, composed of permeable material such as filter paper or non-woven fabric, is made by duly folding a portion of material cut from a film of the aforesaid material unwound from a coil to form a cavity (typically having the conical or truncated cone shape).

The filtering elements are introduced in their respective casings of the capsule and fixed thereto by welding in the packaging machine.

The above described production method is complex and laborious and requires the packaging machine to be provided with a station able to assemble the capsules, in other words to fix the filtering elements to the respective casings.

The steps of withdrawing, moving and inserting the filtering elements are particularly crucial due to the frailty and instability of the filtering elements, once folded and shaped. The assembling station means must be very precise and accurate to ensure that the filtering element is not damaged or deformed or wrongfully positioned in the capsule, thereby causing the capsule to be discarded and consequently decreasing the productivity of the packaging machine.

Such machine is thus more complex and expensive than packaging machines commonly used to fill capsules with products such as coffee, tea and the like.

From WO2013064988 a method and an apparatus for making a beverage capsule are known, such capsule comprising a cup-shaped outer rigid body, comprising a closed bottom and an upper opening coupled with a concave-section filter, extending along the rigid body to form a containment chamber of a dose of product, and a foil lid to close the upper opening of the rigid body along the outer edge of the rigid body thereof.

The method is characterized in that it comprises the following steps:
positioning a flat piece of filter on the rigid body;
joining the flat piece of filter at least at the edge of the rigid body;
forming the piece of filter inward to the rigid body by means of a plastic deformation of the flat piece to define the containment chamber;
filling in the containment chamber with a dose of product;
closing the chamber and the rigid outer body with the foil lid.

The method also provides cutting the filter piece from a continuous strip through a cutting unit, moving the filter piece over an opening of the rigid body and subsequently welding the flat filter piece to the outer edge of the rigid body thereof by means of joining means.

The method also provides that the forming step includes one first pre-forming step wherein an annular filter portion close to the edge is elastically deformed by stretching by a first annular punch and a second complete forming step wherein a central portion of the filter is elastically deformed by means of a second punch.

The first pre-forming stretching step and the second complete forming stretching step are made by means of hot punches.

The adhesion of the flat filter piece to the outer edge of the rigid body thereof occurs by thermowelding joining means or using a gluing unit.

In the method disclosed in WO2013064988 the step of positioning the filter piece on the body of the capsule is particularly crucial, as a wrongful positioning may compromise the bonding of the filter to the edge of the capsule and cause therefore the discard of the capsule and a productivity decrease.

The apparatus for producing capsules according to WO2013064988 is rather complex as it provides a cutting station for cutting a filter piece from a continuous filtering material strip, a station for positioning and fixing the filter to the capsule and at least one station for forming the filter. Furthermore, the apparatus must be associated to a machine for forming the body of the capsule.

From WO2013171663, in the name of the applicant of the present application, a method and an apparatus are known for making a capsule provided with a casing containing a filtering element suitable for receiving a product for preparing a beverage.

The method provides the following steps:
applying a film of filtering material to a casing with a cavity so as to cover an opening of said cavity;
blocking said film to said casing;
heating and stretching a portion of said film facing said cavity and blocked to said casing such that a filtering element is formed and obtained.

The apparatus comprises superimposing means for applying a film of filtering material to at least one casing with a cavity, in such a way as to cover an opening of said cavity, blocking means for blocking the film of filtering material on the casing, first stretching means comprised in a first stretching station for heating and stretching a portion of the film of filtering material facing said cavity and blocked on said casing so as to obtain a filtering element, and second stretching means comprised in a second stretching station for further stretching and stabilizing the filtering element.

The apparatus disclosed in WO2013171663 is also rather complex, as it provides a station for applying a film of filtering material on the capsule body and two separate stations for the filter formation. Furthermore, the apparatus disclosed in WO2013171663 must also be associated to a machine for forming the body of the capsule.

SUMMARY

An object of the present invention is to simplify the methods and apparatuses for forming beverage capsules provided with a filter, a concave section, extending inside a cavity of the capsule body for forming a chamber for containing a dose of a product for producing a beverage.

A further object of the present invention is to provide a method and an apparatus which allow to reduce production costs of capsules and minimize production rejects.

BRIEF DESCRIPTION OF THE DRAWINGS

One non limiting embodiment of the method and apparatus according to the invention will be described hereinafter referring to the enclosed drawings, wherein.

DETAILED DESCRIPTION

Figure 1:
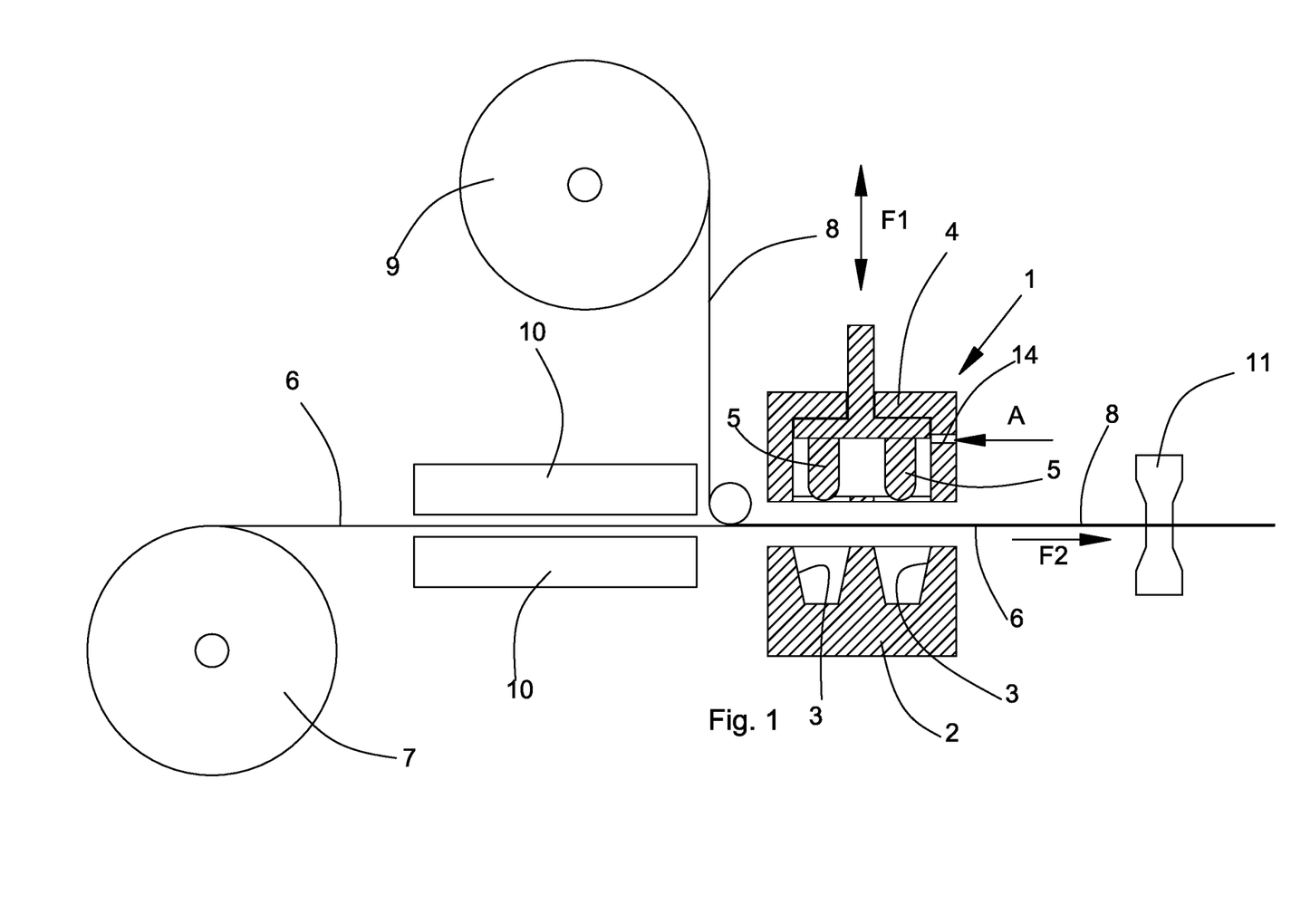
FIG. 1 is a schematic view of an apparatus according to the invention.

In FIG. 1 it is illustrated one forming mold 1 for making beverage capsules provided with a concave-section filtering element 13 (FIG. 4) extending inside a cavity of the body 12 of the capsule for forming a containment chamber of a dose of product for producing a beverage.

The mold 1 comprises a lower half mold 2, wherein a plurality of cavities 3 is obtained intended to form the capsule body, and an upper half mold 4 provided with a plurality of stretching elements 5, for instance punches, one for each cavity 3, movable in one direction indicated by the double arrow F1 and intended to form the body 12 of the capsules and the respective filtering elements 13 by stretching a thermoplastic material and a filtering material respectively, as will be explained in detail hereinafter. In the illustrated example it is shown a mold 1 with two cavities 3. It is understood that there can be any number of cavities 3 in the mold 1.

The mold 1 is supplied with a first film 6 of thermoformable plastic material, which can also be, for example, a compostable plastic material, and with a second film 8 of filtering material, in particular a non-woven tissue, and arranged so as to be superimposed to the strip of thermoformable plastic material.

The first film 6 of thermoformable plastic material can be wound on a first coil 7 and the second film 8 of filtering material may be wound on a second coil 9. Alternatively the first film 6 of thermoformable plastic material and the second film 8 of filtering material may be wound on a same coil.

The first film 6 of thermoformable plastic material and the second film 8 of filtering material are advanced together between the upper half mold 4 and the lower half mold 2 in a direction and in an advancement direction indicated by arrow F2, which is perpendicular to direction F1 along which punches 5 are movable. The transversal dimensions of the first film 6 and of the second film 8, in a direction perpendicular to the advancement direction F2 and to the direction F1, are preferably substantially the same.

Upstream of the mold 1, with respect to the advancement direction F2, a preheating device is arranged comprising a pair of heating elements, including, for example, heating plates, or heating lamps, by means of which the first film 6 is heated up to a softening temperature to allow the subsequent deformation for forming the capsule body.

Figure 7:
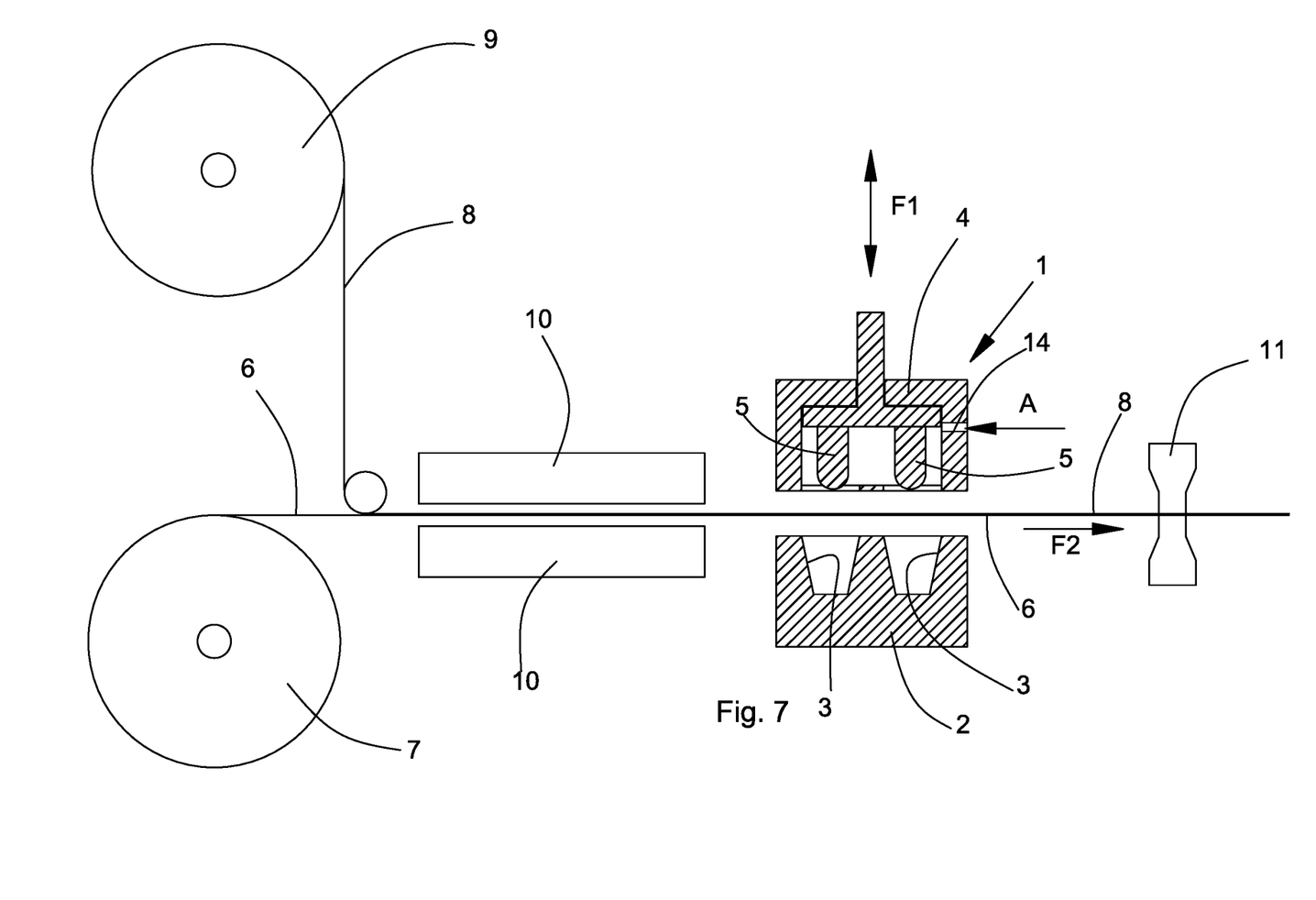
FIG. 7 is a view as that of FIG. 1, relative to a further variant of the invention.

In the illustrated embodiment, only the first film 6 of thermoformable plastic material is passed through the pair of heating elements 10. Alternatively it is possible to place the second coil 9 upstream of the heating elements 10 so that the second film 8 of filtering material also can pass through the heating elements 10 and can be preheated in order to facilitate the deformation during the forming of the filtering elements 13 (FIG. 7).

Figure 8:
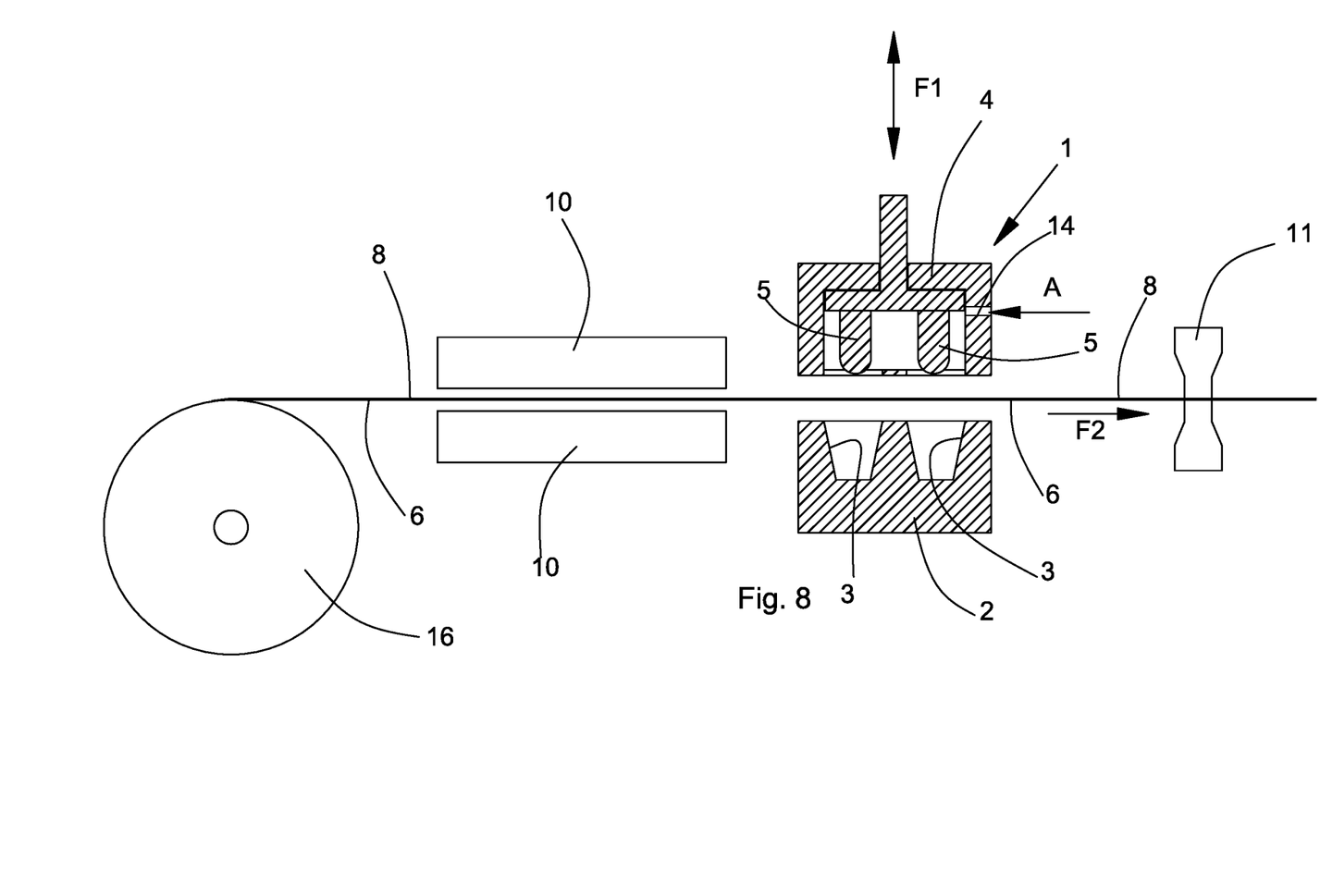
FIG. 8 is a view as that of FIG. 1, relative to a still further variant of the invention.

If both films are wound on the same coil 16 (FIG. 8), this is arranged upstream of the heating elements 10 so that both films can pass through the heating elements to preheat them.

Downstream of the mold 1, with respect to the advancement direction F2, a gripper element 11 is positioned, or a catenary, movable in both ways in the advancement direction F2, which is used to advance the first film 6 and the second film 8 in the advancement direction F2, and to keep them taut. The gripper element 11, or the catenary, acts as supplying means of the first film 6 and of the second film 8 to the forming mold 1, as while moving in the advancement direction F2 it unwinds the first film 6 and the second film 8 from their respective coils.

If the second film 8 of filtering material has not been preheated, the first film 6 of preheated thermoplastic material heats the second film 8 of filtering material, while the two films are supplied to the mold 1, so as to facilitate the deformation of the second film 8 of filtering material during the forming of the filtering material 13.

In FIG. 1, mold 1 is illustrated in open position, before the starting of the forming of the capsule body and their respective filters.

Figure 2:
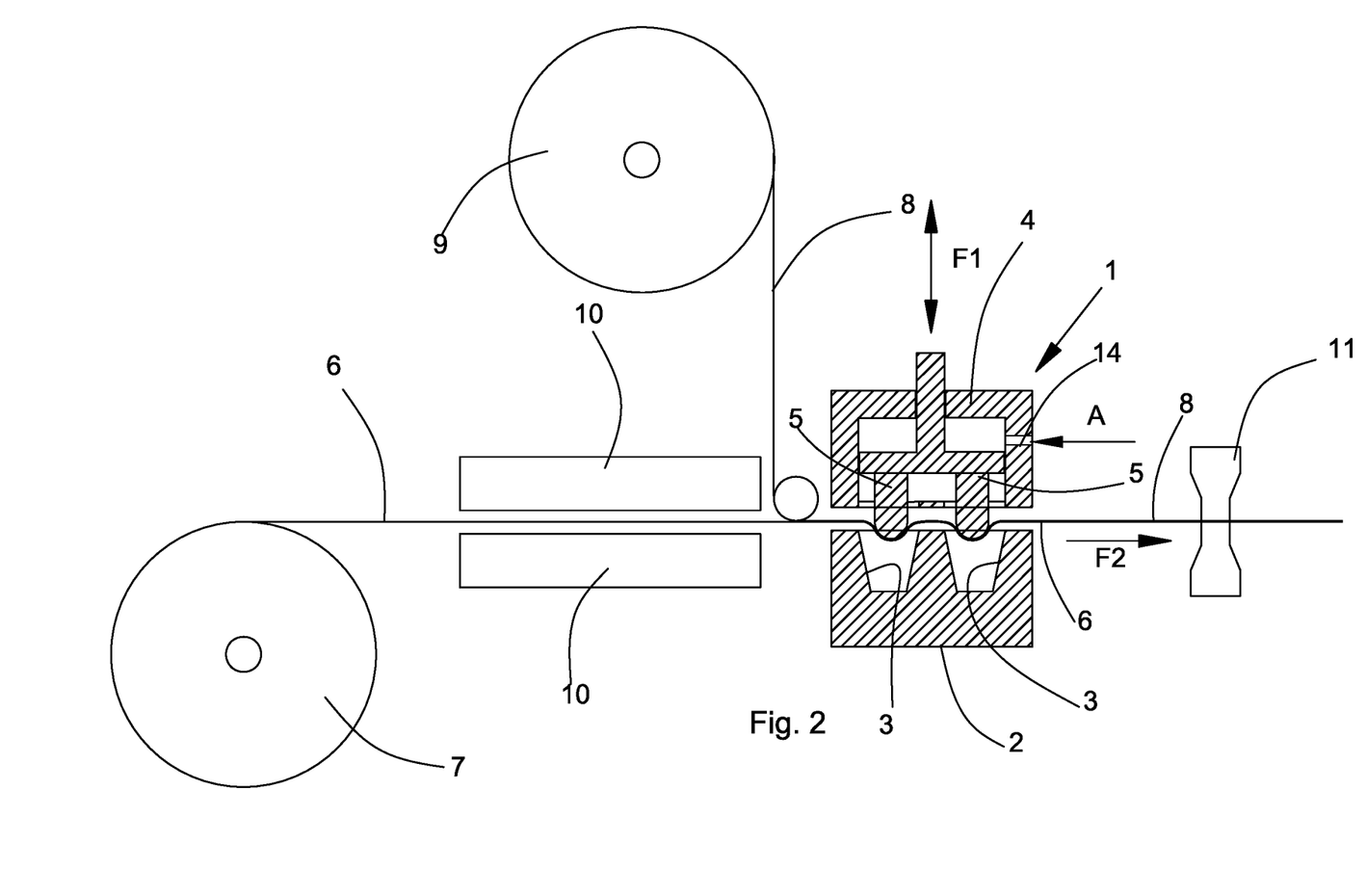
FIG. 2 is a view as that of FIG. 1 which illustrates a first step of the method according to the invention.

In FIG. 2 it is illustrated a first step of the forming of the capsule body 12 and of the filtering elements 13, wherein the lower half mold 2 and the upper half mold 4 are brought towards one another and punches 5 are moved towards the lower half mold 2 until they contact the first film 6 of thermoplastic material and the second film 8 of filtering material and partially deform them to realize a first stretching of the first film 6 and of the second film 8, by performing a so called "enrichment" process of the thermoplastic material and of the filtering material, avoiding that during the following stretching or deep drawing operations, required for forming the body 12 of the capsule (FIG. 6) and the filtering element 13 according to desired sizes and volume, the thermoplastic material and the filtering material may tear or wear thin excessively.

Figure 3:
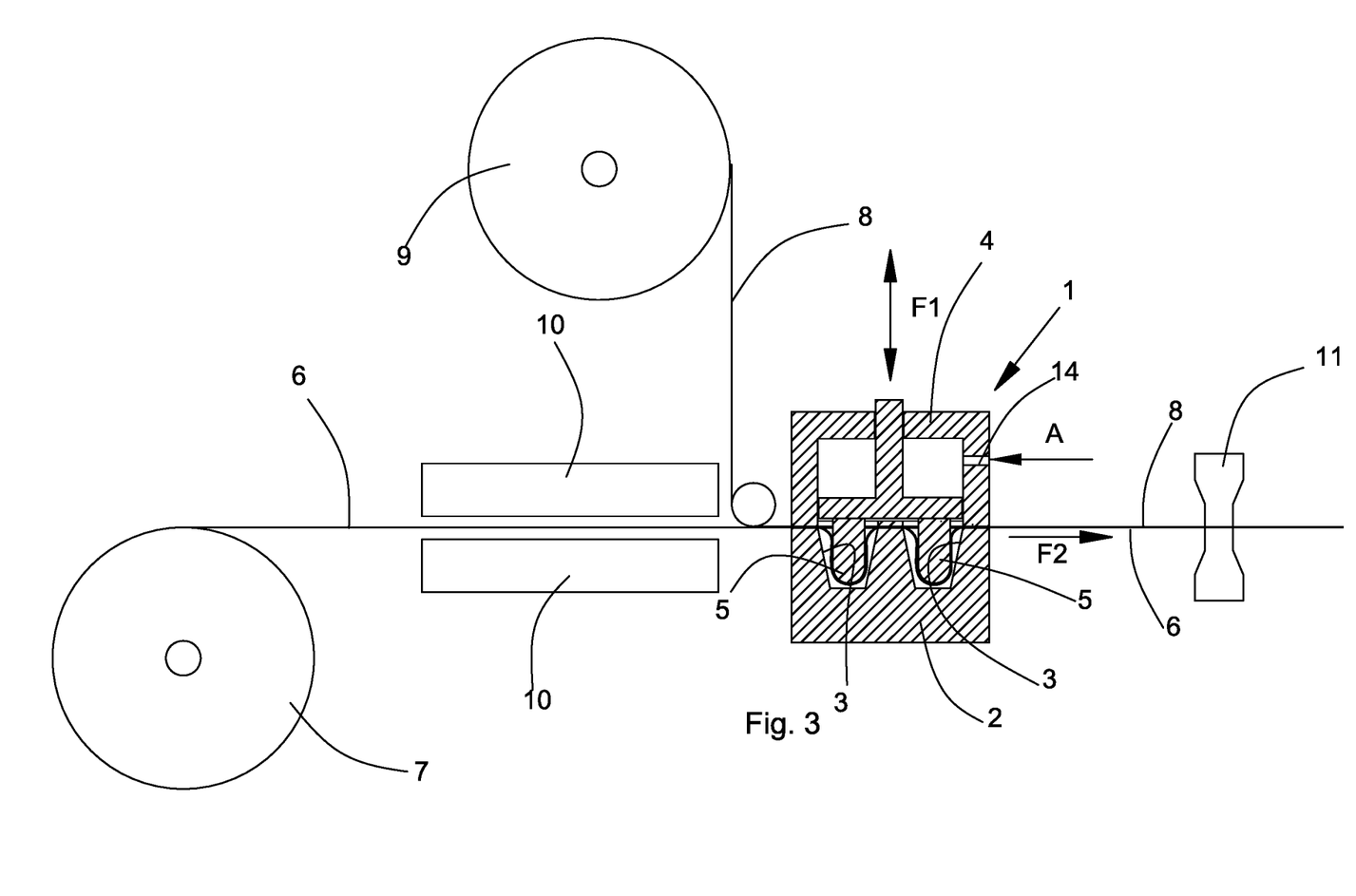
FIG. 3 is a view as that of FIG. 2 which illustrates a second step of the method according to the invention.

In FIG. 3 it is illustrated a second step of the method according to the invention, wherein the mold 1 is closed, clamping the first film 6 and the second film 8 between the lower half mold 2 and the upper half mold 4, and punches 5 are advanced inside the cavities 3 to simultaneously obtain a pre-formation of the bodies 12 of the capsules and of the filtering elements 13.

When the first film 6 of thermoplastic material and the second film 8 of filtering material are clamped between the lower half mold 2 and the upper half mold 4, the thermoplastic material and the filtering material are welded together in preset zones 15, due to the fact that the thermoplastic material, which has been heated by the heating plates 10, is in a softening state, determining, together with the pressure exerted by the two half molds, the welding of the thermoplastic material with the filtering material. It should be noted that in order to guarantee the welding of the thermoplastic material and of the filtering material it is not necessary to heat the two half molds, which allows a significant energy saving.

Figure 4:
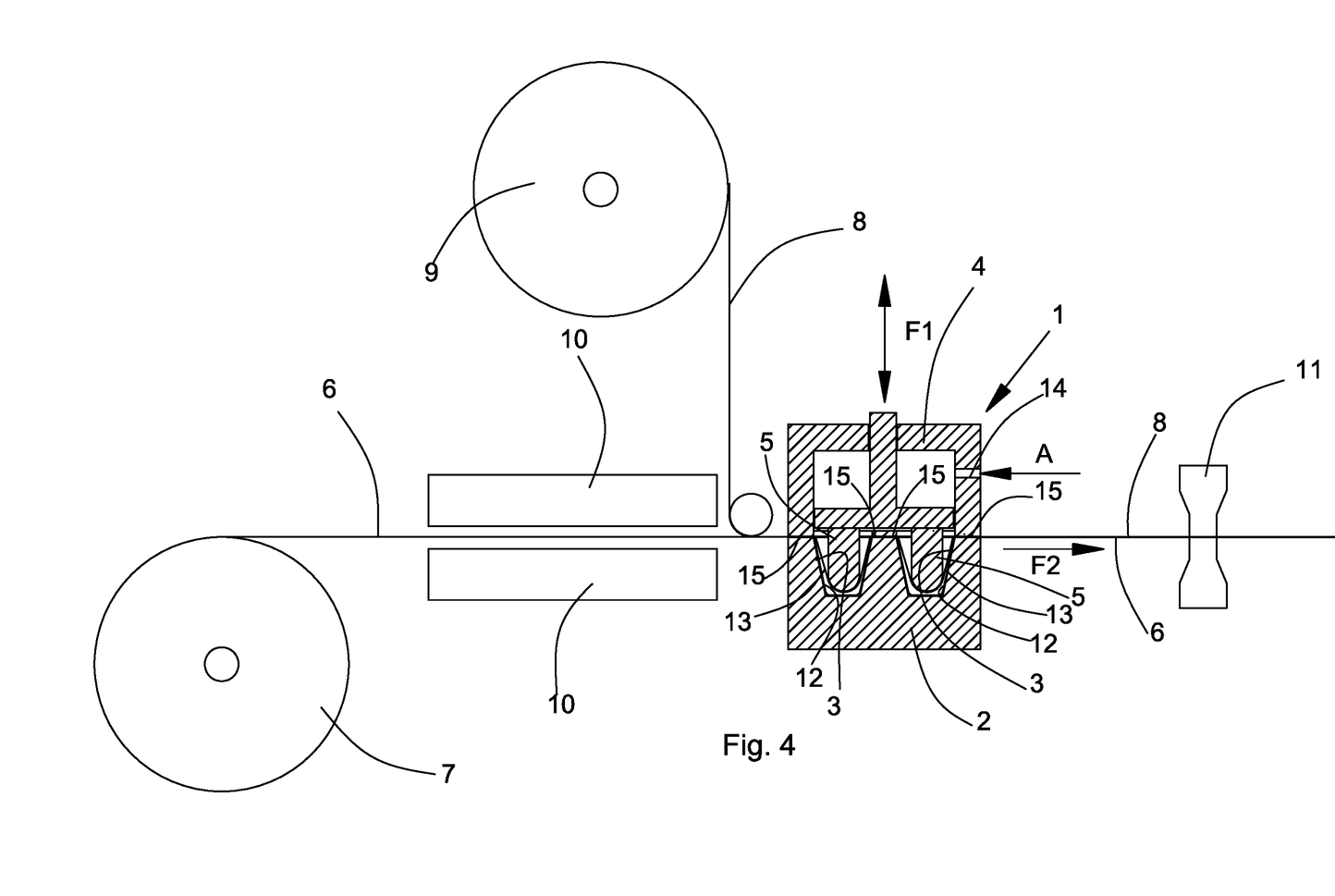
FIG. 4 is a view as that of FIG. 3 which illustrates a third step of the method according to the invention.

In FIG. 4 it is illustrated a third step of the method according to the invention, wherein compressed air is injected into the mold 1 through an inlet channel 14 provided, for example, in the upper half mold 4. The inlet of air is indicated with an arrow A, in FIG. 4. Compressed air, passing through the second film 8 of the filtering material separates therefrom the first film 6 of thermoplastic material and deforms both of the thermoplastic material and the filtering material until they assume in each cavity 3 the final shape of the respective capsule body 12 and of the filtering element 13.

During or after the inlet of compressed air into the mold, when the first film 6 of thermoplastic material has separated from the second film 8 of filtering material, an extra stroke downwards of the punches 5 can be provided, to increase the depth of the filtering element 13 inside the body 12 of the capsule.

Figure 5:
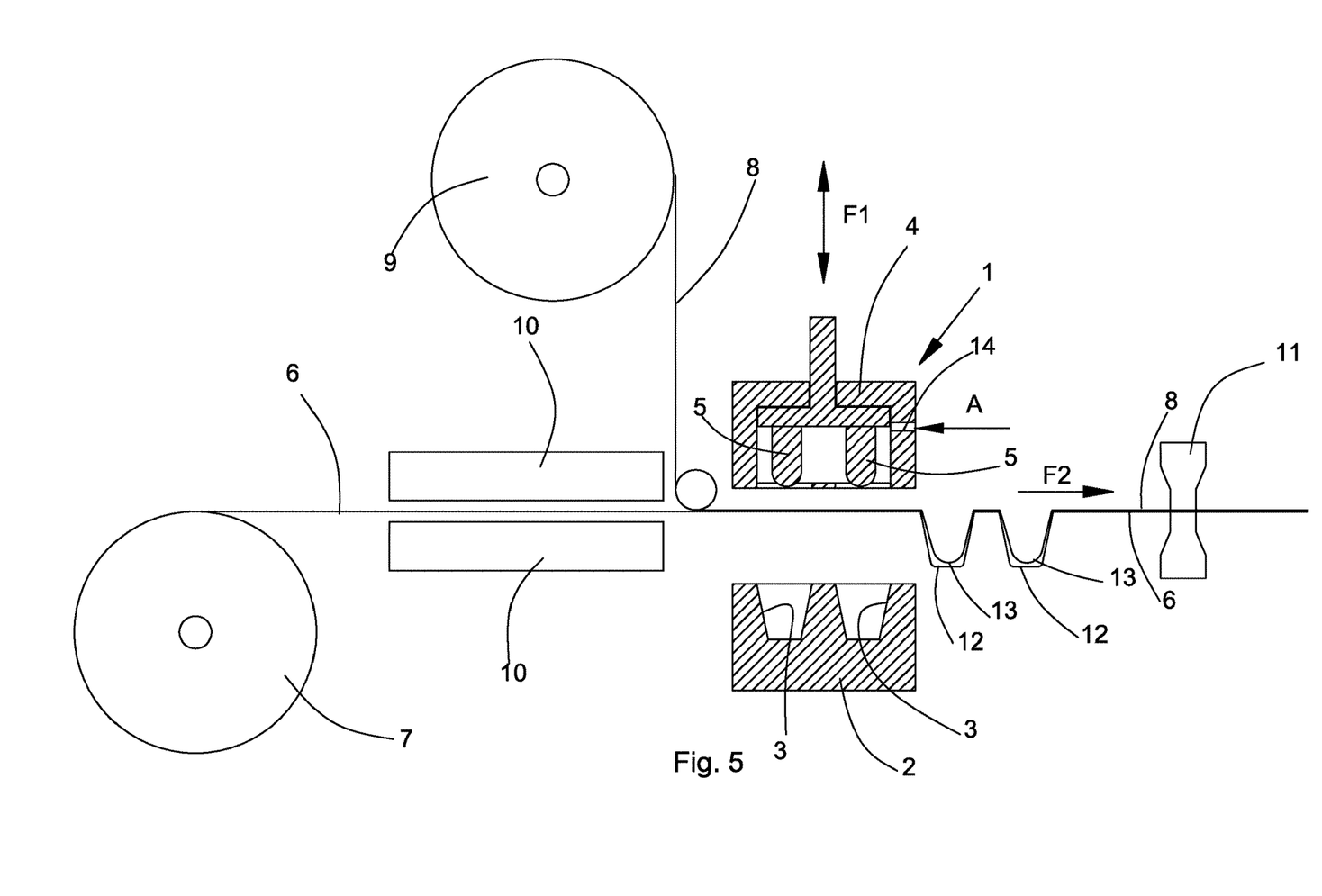
FIG. 5 is a schematic view which illustrates a fourth step of the method according to the invention.

In FIG. 5 it is illustrated the final step of the forming of the capsule bodies 12 with their respective filtering elements 13, wherein the mold 1 is opened and the formed capsule bodies 12, with the respective filtering elements 13, are extracted out of the mold 1 which is ready for a subsequent forming cycle.

Figure 6:
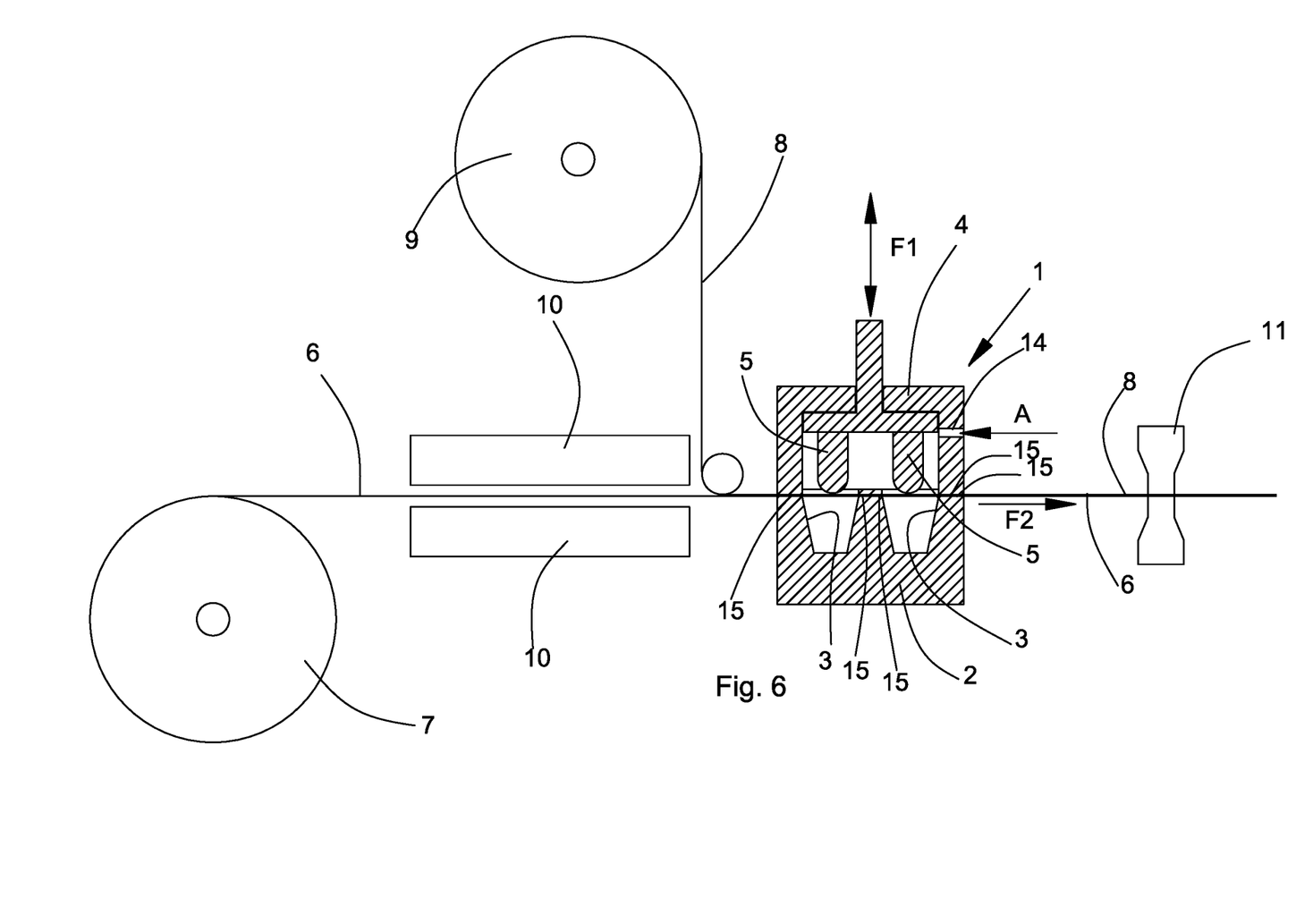
FIG. 6 is a schematic view which illustrates a variant of the method according to the invention.

In FIG. 6 it is illustrated a variant of the method according to the invention, wherein the "enrichment" process of the material is omitted. In this variant of the method according to the invention, in a first step, illustrated in FIG. 6, the mold is closed, so as to weld together in preset zones 15 the first film 6 of thermoplastic material and the second film 8 of filtering material. As previously explained, it is not necessary to heat the two half molds to obtain the welding of the thermoplastic material with the filtering material.

Thereafter, in a second step, the punches 5 are advanced inside the cavities 3 to obtain a pre-formation of the bodies 12 of the capsules and of the filtering elements 13, similarly to what is illustrated in FIG. 3.

In a third step, compressed air is introduced into the upper half mold 4, similarly to what is illustrated in FIG. 4, in order to detach the first film 6 of thermoplastic material from the second film 8 of the filtering material and deform both the thermoplastic material and the filtering material until they assume, in each cavity 3, the final shape of the respective capsule body 12 and of the filtering element 13.

Finally, the mold 1 is opened to extract therefrom the formed capsule bodies 12, with the respective filtering elements 13, as already shown in FIG. 5.

The capsule bodies 12 with the respective filtering elements 13, after having been extracted out from the forming mold 1 are sent towards a shearing station (not shown) wherein the capsule bodies 12 are separated from each other by shearing. Shearing may be carried out in zones where the thermoplastic material 6 and the filtering material 8 are welded together, or in zones where the two materials are not welded together. In this latter case it is possible to easily separate the thermoplastic material from the filtering material in the shearing offcuts, facilitating the disposal of offcuts.

Owing to the invention a significant simplification of the process for forming capsule bodies 12 with the respective filtering elements 13 and the forming apparatus is obtained, as the forming of the capsule bodies 12 and of the filtering elements 13 occurs simultaneously in one single mold reducing remarkably the production time and the plant costs, as it is no longer required to provide separate stations for forming the capsule bodies 12 and the filtering elements 13.

Furthermore, the simultaneously forming of the capsule bodies 12 and of the respective filtering elements 13, reduces to the minimum the production rejects, with respect to the methods and apparatuses known in the state of the art. It should be noted that if the first film 6 of thermoplastic material and the second film 8 of filtering material are heated together, it is possible, using heating plates 10, to weld the two films together before they arrive to the forming mold 1, exerting a pressure by means of heating plates 10.

Thereby the first film of thermoplastic material 6 and the second film 8 of filtering material, being joint together, undergo the same deformations during the formation of the capsule bodies 12 and filtering elements 13, both due to the action of punches, and to the action of compressed air. It is thus possible to obtain filtering elements 13 which substantially have the same shape and size of capsule bodies 12.

The invention claimed is:

1. A method for making a capsule provided with a body containing a filtering element suitable for receiving a product for preparing a beverage, including the steps of:

supplying a first film of thermoplastic material and a second film of filtering material to a forming mold according to a supplying direction, superimposing said second film on said first film, said forming mold having a lower half mold in which a plurality of cavities is obtained and an upper half mold provided with a plurality of stretching elements, one for each cavity, which are movable in a direction that is perpendicular to said supplying direction;

pre-heating to a softening temperature said first film of thermoplastic material, by a pre-heating device arranged upstream of said forming mold;

closing said forming mold bringing said lower half mold and said upper half mold towards one another until they clamp between one another said first film of thermoplastic material and said second film of filtering material;

simultaneously forming in said cavities the bodies of the capsules and the respective filtering elements, using said stretching elements; and delivering compressed air to said forming mold to separate the first film of thermoplastic material from the second film of filtering material and deform both the thermoplastic material and the filtering material until, in each cavity, they reach the final shape of the respective capsule body and of the filtering element associated therewith.

2. The method according to claim 1, wherein, before closing said forming mold, said stretching elements are moved towards said lower half mold until they come into contact with the second film of filtering material superimposed to the first film of thermoplastic material and partially deform said first film of thermoplastic material and said second film of filtering material.

3. The method according to claim 1, wherein said forming includes advancing said stretching elements inside the cavities of the lower half mold to obtain simultaneously pre-forming of the bodies of the capsules and of the respective filtering elements.

4. The method according to claim 1, wherein said first film and said second film are advanced in said advancement direction and are kept taut by at least one supplying means located downstream of said mold, with respect to said advancement direction.

5. The method according to claim 1, wherein during said closing said first film and said second film are welded together in preset zones.

6. The method according to claim 1, wherein during, or after, the delivery of compressed air to said forming mold, when the first film of thermoplastic material is separated from the second film of filtering material, the stretching elements perform an extra stroke downwards to increase the depth of the filtering element inside the body of the capsule.

7. The method according to claim 1, wherein said first film of thermoplastic material and said second film of filtering material are both preheated and pressed against one another by said pre-heating device so as to be welded together before being supplied to said forming mold.

8. The method according to claim 7, wherein said compressed air deforms the thermoplastic material and the filtering material welded together, until, in each cavity, they reach the final shape of the respective capsule body and of the filtering element associated therewith.

9. The method according to claim 4, further comprising opening said mold at the end of forming the capsule bodies and the respective filtering elements and extracting from the mold said capsule bodies with the respective filtering elements with the help of said supplying means.

10. The method according to claim 1, wherein said thermoplastic material is a compostable material.

11. An apparatus for making a capsule provided with a body containing a filtering element suitable for receiving a product for preparing a beverage, said apparatus including a forming mold having a lower half mold in which a plurality of cavities is obtained and an upper half mold provided with a plurality of stretching elements, one for each cavity, which are movable in a direction, said stretching elements being intended to simultaneously obtain the bodies of the capsules and the filtering elements, and further including:

a supplying means that is movable in an advancement direction that is perpendicular to said direction, to supply simultaneously to said forming mold and to keep taut a first film of thermoplastic material and a second film of filtering material, a pre-heating device for pre-heating at least said first film of thermoplastic material before it is supplied to said forming mold, and a conduit through which compressed air can be delivered inside the forming mold;

wherein said supplying means includes a gripper element or a catenary element;

wherein said second film of filtering material is arranged in such a manner as to be preheated by said preheating device, together with said first film of thermoplastic material;

wherein said pre-heating device includes heating plates and wherein said heating plates are arranged so as to exert on said first film of thermoplastic material and on said second film of filtering material, during preheating thereof, a pressure, such that said first film and said second film are welded together.

12. A method for making a capsule provided with a body containing a filtering element suitable for receiving a product for preparing a beverage, including the steps of:

supplying a first film of thermoplastic material and a second film of filtering material to a forming mold according to a supplying direction, superimposing said second film on said first film, said forming mold having a lower half mold in which a plurality of cavities is obtained and an upper half mold provided with a plurality of stretching elements, one for each cavity, which are movable in a direction that is perpendicular to said supplying direction;

pre-heating to a softening temperature said first film of thermoplastic material, by a pre-heating device arranged upstream of said forming mold;

closing said forming mold bringing said lower half mold and said upper half mold towards one another until they clamp between one another said first film of thermoplastic material and said second film of filtering material; and simultaneously forming in said cavities the bodies of the capsules and the respective filtering elements, using said stretching elements;

wherein said first film of thermoplastic material and said second film of filtering material are both preheated and pressed against one another by said pre-heating device so as to be welded together before being supplied to said forming mold.

13. The method according to claim 12, wherein said compressed air deforms the thermoplastic material and the filtering material welded together, until, in each cavity, they reach the final shape of the respective capsule body and of the filtering element associated therewith.

* * * * *